Figure 1:
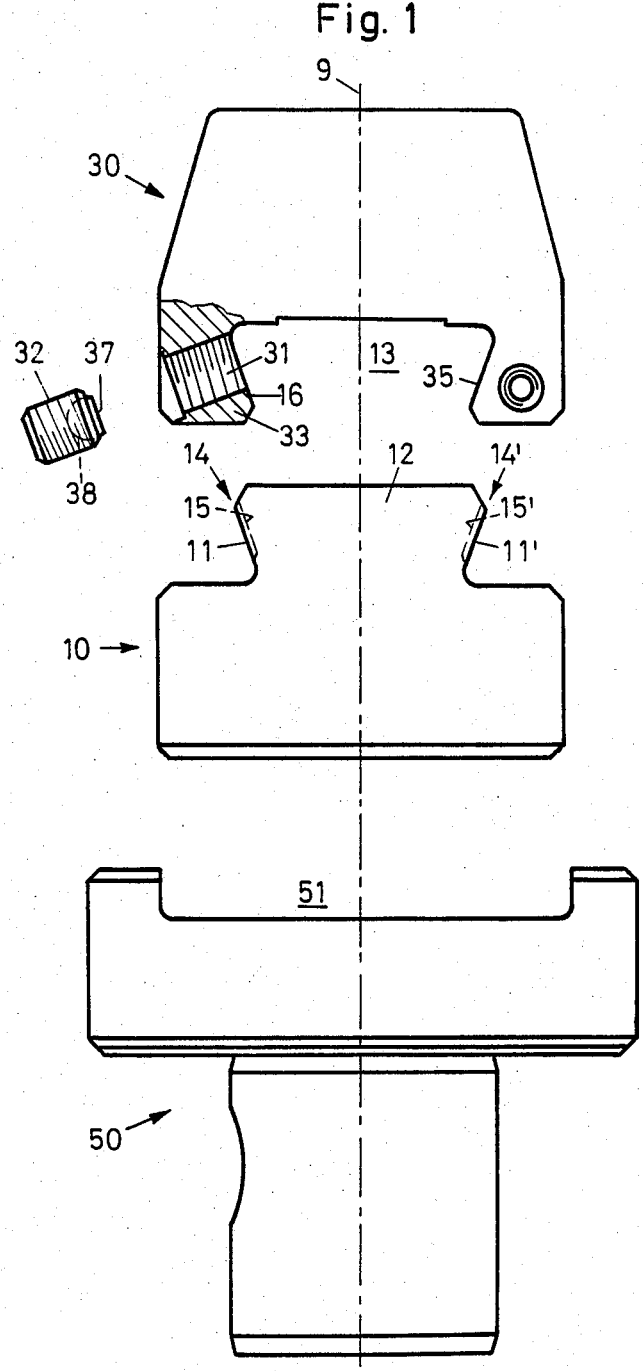

United States Patent [19]

Pape et al.

[11] Patent Number: 4,547,103
[45] Date of Patent: Oct. 15, 1985

[54] BORING TOOL

[75] Inventors: Dieter Pape, Rümlang; Hans Woerz, Oberhasli, both of Switzerland

[73] Assignee: Heinz Kaiser AG, Rumlang, Switzerland

[21] Appl. No.: 507,520

[22] Filed: Jun. 24, 1983

[30] Foreign Application Priority Data

Jun. 28, 1982 [CH] Switzerland ............... 3955/82

[51] Int. Cl.⁴ .......................................... B23B 29/08
[52] U.S. Cl. ................................. 408/197; 279/83; 407/45; 408/239 R
[58] Field of Search .............. 408/186, 197, 153, 181, 408/185, 198, 196, 190, 189, 194, 233, 239, 713; 277/1 B, 83; 407/37, 45

[56] References Cited

U.S. PATENT DOCUMENTS 2,349,189  5/1944  Murray .................... 408/153
4,171,821 10/1979  Miller ..................... 279/1 B
4,266,895  5/1981  Lewis ...................... 279/83

FOREIGN PATENT DOCUMENTS 133045 11/1978 German Democratic Rep. ..................... 408/181

Primary Examiner—Z. R. Bilinsky
Attorney, Agent, or Firm—Weiser & Stapler

[57] ABSTRACT

The boring tool has an insert upon which one or two boring heads are slidably guided along a swallowtail track. For fixing the boring heads in position, set screws are provided which are adapted to bear against the clamping surfaces of the insert. To preclude radial sliding of the boring heads, even when the set screws are only partially tightened, the clamping surfaces are inclined relative to the longitudinal axis of the insert, and the spacing of the clamping surfaces from the longitudinal axis increases toward the ends of the insert.

8 Claims, 5 Drawing Figures

BORING TOOL

The invention relates to a boring tool in accordance with the preamble of independent claim 1.

The boring tools, which are built like an erector set from several interchangeable structural elements, e.g. shafts, extensions, reducers and boring heads, have proven to be precise and adaptable tooling systems. Such a boring tool is disclosed, for example, in Swiss Patent No. 537,770. To increase the boring range, the boring heads are attached or mounted upon an insert, on which they are slidable radially with respect to the tool axis along a swallowtail track, and to which they are fixedly attachable by means of set screws. However, if the set screws are not firmly tightened, then at high rates of revolution the boring head is flung off like a projectile due to centrifugal force. Such work incidents occur again and again, despite all precautions. Therefore, these boring tools present a accident hazard which can lead to injuries and to high costs for the manufacturer due to product liability.

Accordingly, it is an object of the invention to improve the operating safety of boring tools of the initially described type, without thereby limiting their utility and making their operation more difficult.

This and other objects which will appear are achieved by the features of the characterizing portion of independent claim 1. Further desirable features appear from the dependent claims.

Figure 2:
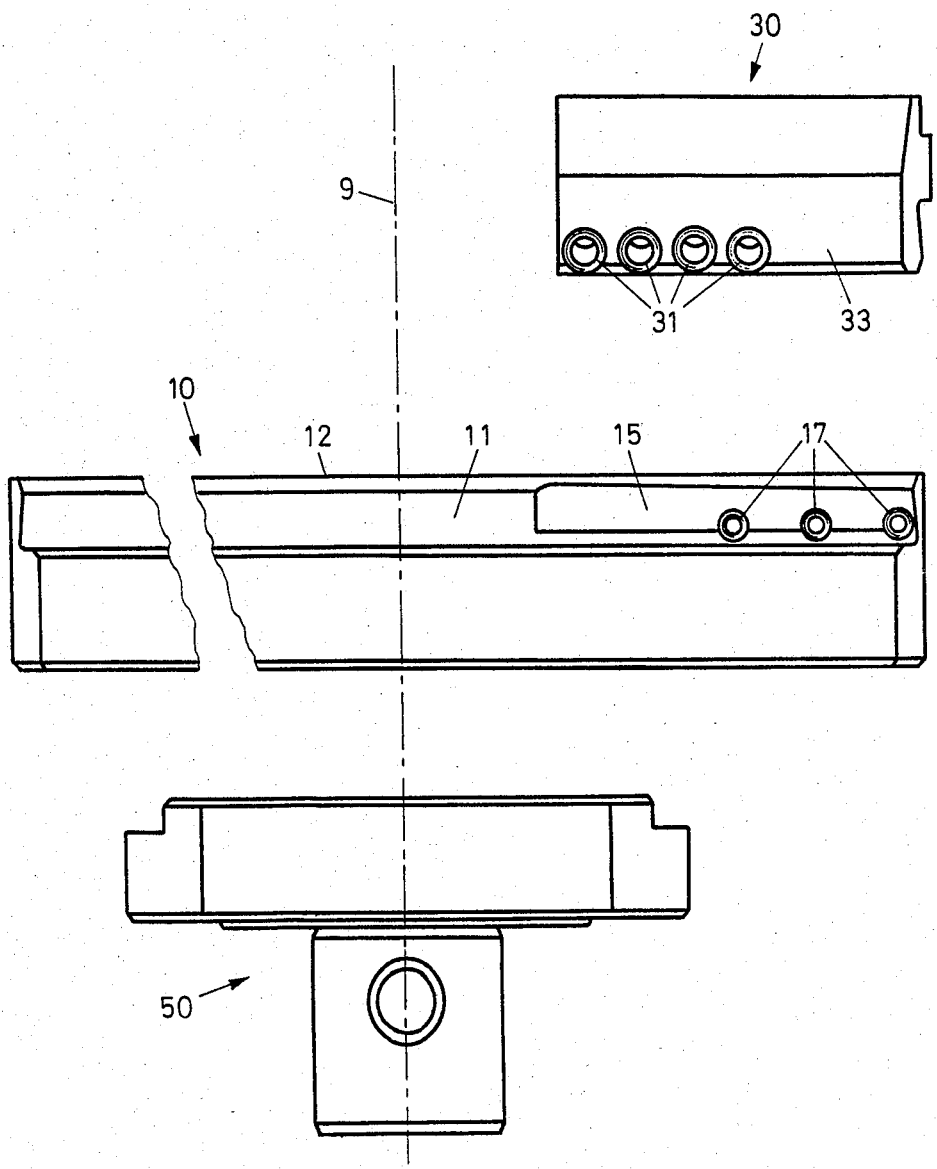
Figure 3:
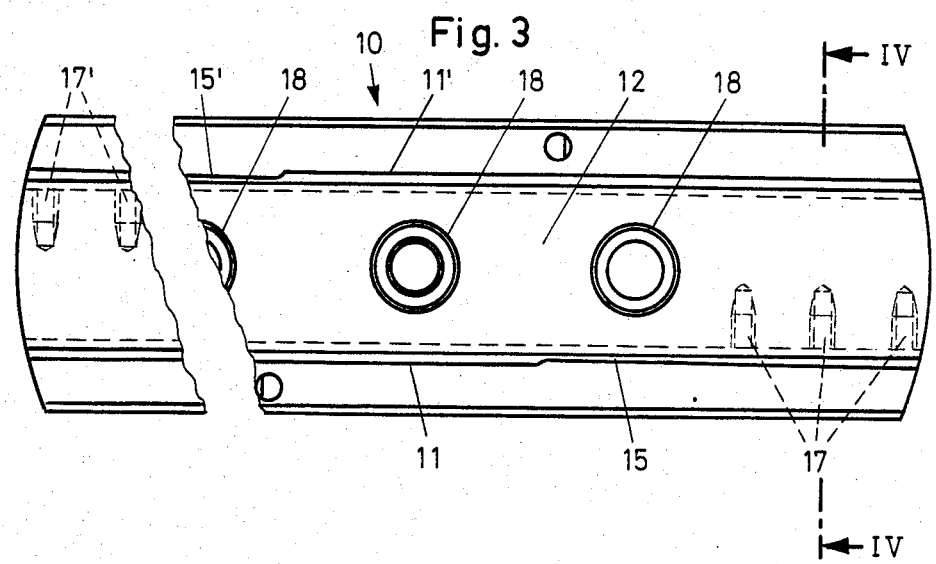
Figure 4:
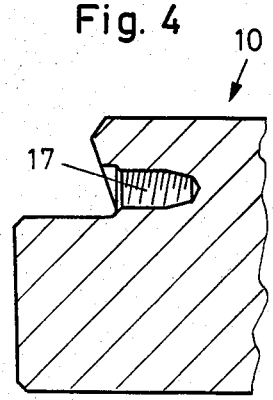
Figure 5:
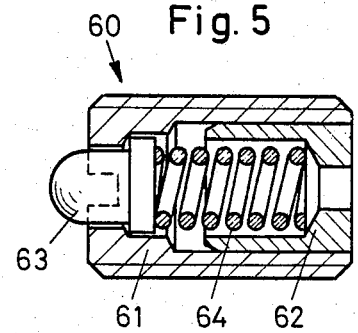

An illustrative example of the invention is further described in what follows with reference to the drawings in which:

FIG. 1 shows a partial exploded view, partly in cross-section, of a boring tool, FIG. 2 shows an exploded view of an elevation of a boring tool, FIG. 3 shows a top view of an insert viewed in the direction of the tool axis, FIG. 4 is a cross-section along line IV—IV of FIG. 3, and FIG. 5 is a cross-section through a pressure element.

As shown in FIGS. 1 and 2, the boring tool consists essentially of a flange 50 adapted to be connected to a shaft (not shown), an insert 10, and one or two boring heads 30. For special applications, extensions and reducers can also be added. The insert 10 is provided with bore heads 18 (FIG. 3) so that the inserts 10 which fits into slot 51 of flange 50, can be attached by means of screws (not shown here). The insert 10, which is preferably of one piece, is positioned at right angles to the tool axis and exhibits a swallowtail projection 12 parallel to its longitudinal axis, upon which one or two boring heads 30 are slidably guided.

Boring head 30 is provided with bore holes 31 in a guide track 33, into which the set screws 32 can be inserted. The bore holes 31 are so oriented that the front surfaces 37 of the set screws 32 can bear against the clamping surfaces 15 and 15' of the swallowtail projection 12. As set screws 32 there may be used screws which have balls 38 set into their front surface, and which have a flat polished bearing surface 37, corresponding in inclination to the position of clamping surface 15, 15'.

The slide surfaces 11 and 11' of the swallowtail projection 12 have recesses 15 and 15', respectively, which deepen in the direction toward the tool axis 9 of the insert 10. As shown in FIG. 3, the clamping surfaces 15 and 15' are located at the ends of the insert 10.

The bore holes 31 for the set screws 32 are so arranged that, when the boring head 30 is applied and adjusted, the front surfaces 37 of the set screws 32 bear against the clamping surfaces 15 and 15' when tightened. If all or some of the set screws 32 are insufficiently tightened, then during rotation of the boring took the boring head 30 is displaced outwardly in a radial direction only far enough until the set screws 32 firmly bear against clamping surfaces 15 or 15'. In this way the boring head becomes firmly attached to the insert 10. The angle of inclination between the bearing surfaces 15 and 15' and the slide surfaces 11 and 11' is preferably less than one angular degree.

For adjustment, the boring head 30 must be slidable without play upon the insert 10. Also the boring head 30 should not change its adjustment position during tightening of the set screws 32. To achieve this, bore holes 17 (FIG. 4) are provided upon each clamping surface 15 and 15', into which there is respectively screwed a pressure element 60 (FIG. 5). As shown in FIG. 5, a pressure element 60 consists of a threaded plug 61, a receptacle 62, a pressure spring 64, and a bolt 63. When pressure element 60 is in place, the bolts 63 extend far enough beyond clamping surfaces 15 and 15' that spring pressure causes them to press against the slide surfaces 16 of guide track 33, and thereby guide the boring head 30. Through the pressure of bolts 63, the opposing sliding surface 35 of the boring head 30 is pressed against slide surface 11'. Thus the boring head 30 can be displaced precisely without play in radial direction, despite the inclined clamping surfaces 15 and 15', and can be fixed in place without changing its position.

We claim:

1. A boring tool for boring bore holes, having an insert upon which one or two boring heads are guided transverse to the tool axis by means of a swallowtail track and are fixedly positionable by set screws, wherein the swallowtail projection of the track has a recess on both of its lateral sliding surfaces, said recess deepening toward the tool axis, and wherein the set screws are adapted to bear against clamping surfaces located within the recesses in order to produce fixed positioning of the boring heads.

2. A boring tool according to claim 1, wherein spring tensioned bolts are provided in the insert, said bolts pressing respectively against a slide surface of the swallowtail slot in the boring head.

3. A boring tool according to claim 1, wherein the set screws are provided with tiltable front surfaces.

4. A boring tool according to claim 1, wherein said boring heads are interchangeable.

5. A boring tool comprising:
 a flange adapted for attachment to a shaft and defining a tool axis, wherein said flange incorporates an insert having a swallowtail track extending transverse to said tool axis;
 at least one interchangeable boring head having a swallowtail slot for receiving the swallowtail projection of said track and for guiding said boring head transverse to said tool axis and along said swallowtail track;
 set screw means for fixedly positioning said boring head on said flange; and
 a recess formed in lateral sliding surfaces of said swallowtail projection, wherein said recesses deepen toward said tool axis and define clamping surfaces located in said recesses and adapted to receive said set screws to fixedly position said boring head to said flange.

6. A boring tool according to claim 5, wherein said recesses deepen progressively, toward said tool axis, defining an inclined clamping surface.

7. A boring tool according to claim 6, wherein said recesses incline fully to an end of said swallowtail track.

8. A boring tool according to claim 5, wherein the sliding surfaces of the swallowtail slot of said boring head are generally parallel to the sliding surfaces of the swallowtail projection of said track.

* * * * *